(12) United States Patent
Takei

(10) Patent No.: US 9,434,212 B2
(45) Date of Patent: Sep. 6, 2016

(54) TIRE

(75) Inventor: Ataka Takei, Urawa-ku (JP)

(73) Assignee: BRIDGESTONE CORPORATION, Tokyo (JP)

( * ) Notice: Subject to any disclaimer, the term of this patent is extended or adjusted under 35 U.S.C. 154(b) by 442 days.

(21) Appl. No.: 14/234,802

(22) PCT Filed: Jul. 26, 2012

(86) PCT No.: PCT/JP2012/068928
§ 371 (c)(1),
(2), (4) Date: Jan. 24, 2014

(87) PCT Pub. No.: WO2013/015346
PCT Pub. Date: Jan. 31, 2013

(65) Prior Publication Data
US 2014/0150941 A1 Jun. 5, 2014

(30) Foreign Application Priority Data

Jul. 26, 2011 (JP) .................................. 2011-163363
Nov. 21, 2011 (JP) .................................. 2011-253833

(51) Int. Cl.
*B60C 19/00* (2006.01)
*B60C 11/03* (2006.01)
(Continued)

(52) U.S. Cl.
CPC ........ *B60C 11/0304* (2013.04); *B60C 11/0306* (2013.04); *B60C 11/04* (2013.01); *B60C 11/12* (2013.01); *B60C 11/1384* (2013.04); *B60C 2011/0344* (2013.04); *B60C 2011/0348* (2013.04); *B60C 2011/0372* (2013.04); *B60C 2011/0381* (2013.04); *B60C 2011/0383* (2013.04); *B60C 2011/0388* (2013.04);

(Continued)

(58) Field of Classification Search
CPC .......... B60C 11/1236; B60C 11/1204; B60C 11/0304
USPC ......................................... 152/209.8, 209.18
See application file for complete search history.

(56) References Cited

U.S. PATENT DOCUMENTS 6,656,300 B1 * 12/2003 Colombo ............ B60C 11/0302
152/209.18

FOREIGN PATENT DOCUMENTS

JP 6-55913 A 3/1994
JP 2006-224770 A 8/2006
(Continued)

OTHER PUBLICATIONS

International Search Report for PCT/JP2012/068928 dated Oct. 9, 2012.

*Primary Examiner* — Timothy Kennedy
(74) *Attorney, Agent, or Firm* — Sughrue Mion, PLLC

(57) ABSTRACT

First inclined grooves (110) and second inclined grooves (160) are formed on a land portion (40) of a tire. The first inclined grooves (110) and second inclined grooves (160) are alternately formed in the circumferential direction of the tire. Circumferential direction sipes (200) comprise: first circumferential direction sipes (210) that are formed extending from the end at the land portion (40) side of the first inclined grooves (110) to the central portion, in the tread width direction, of the second inclined grooves (160); and second circumferential direction sipes (220) that extend from the central portion, in the tread width direction, of the second inclined grooves (160) along the extension line from the first circumferential sipes (210). The second circumferential sipes (220) terminate in the land portion (40).

6 Claims, 5 Drawing Sheets

(51) Int. Cl.
*B60C 11/04* (2006.01)
*B60C 11/12* (2006.01)
*B60C 11/13* (2006.01)

(52) U.S. Cl.
CPC *B60C2011/0393* (2013.04); *B60C 2011/1209* (2013.04)

(56) References Cited

FOREIGN PATENT DOCUMENTS

| | | |
|---|---|---|
| JP | 2009-202772 A | 9/2009 |
| JP | 2009-208391 A | 9/2009 |
| JP | 2010-162989 A | 7/2010 |

* cited by examiner

TIRE

CROSS REFERENCE TO RELATED APPLICATIONS

This application is a National Stage of International Application No. PCT/JP2012/068928 filed Jul. 26, 2012, claiming priority based on Japanese Patent Application Nos. 2011-163363 filed Jul. 26, 2011 and 2011-253833 filed Nov. 21, 2011, the contents of all of which are incorporated herein by reference in their entirety.

TECHNICAL FIELD

The present invention relates to a tire provided with a rib-like land portion that extends in a tire circumferential direction, and provided, on the rib-like land portion, with a circumferential siping extending in the tire circumferential direction.

BACKGROUND ART

Conventionally, a pneumatic tire (hereinafter, referred to as tire) mounted to a passenger vehicle, etc., uses a tread pattern in which a circumferential siping extending in the tire circumferential direction is formed on a rib-like land portion extending, similarly, in the tire circumferential direction.

For example, it is known a tire in which a circumferential siping extending in a tire circumferential direction is formed in the circumferential siping provided in a center portion in a tread widthwise direction in order that a braking performance on a wet road surface coexists with a wear resistance (for example, Patent Literature 1). One end of the circumferential siping is terminated within the rib-like land portion, and the other end of the circumferential siping is communicated to an inclined groove inclined relative to the tire circumferential direction. Further, one end of the inclined groove is terminated within the rib-like land portion, and the other end of the inclined groove is communicated to a circumferential groove adjacent to the rib-like land portion.

However, along with an improvement in performance of a recent general passenger vehicle, there is an increased demand to further improve various performances on a wet road surface. In particular, it is demanded that a water drainage performance and a steering stability, which is normally in a trade-off relationship, coexist at a higher level.

CITATION LIST

Patent Literature

[Patent Literature 1] Japanese Patent Publication No. 2009-202772

SUMMARY OF INVENTION

A tire according to a first feature comprises a land portion divided by a circumferential groove extending in a tire circumferential direction and extending in the tire circumferential direction, and a circumferential siping, which is formed in the land portion, extending in the tire circumferential direction. The land portion is formed with: a first inclined groove that extends from one lateral portion in a tread widthwise direction of the land portion and that is inclined relative to the tire circumferential direction; and a second inclined groove that extends from the other lateral portion in the tread widthwise direction of the land portion and that is inclined relative to the tire circumferential direction. The first inclined groove and the second inclined groove are alternately formed in the tire circumferential direction. The circumferential siping includes: a first circumferential siping that is formed from an end at a land portion side of the first inclined groove to an intermediate portion in the tread widthwise direction of the second inclined groove; and a second circumferential siping that extends from an intermediate portion in the tread widthwise direction of the second inclined groove along on an extended line of the first circumferential siping. The second circumferential siping is terminated within the land portion.

DESCRIPTION OF EMBODIMENTS

[First Embodiment]

Figure 1:
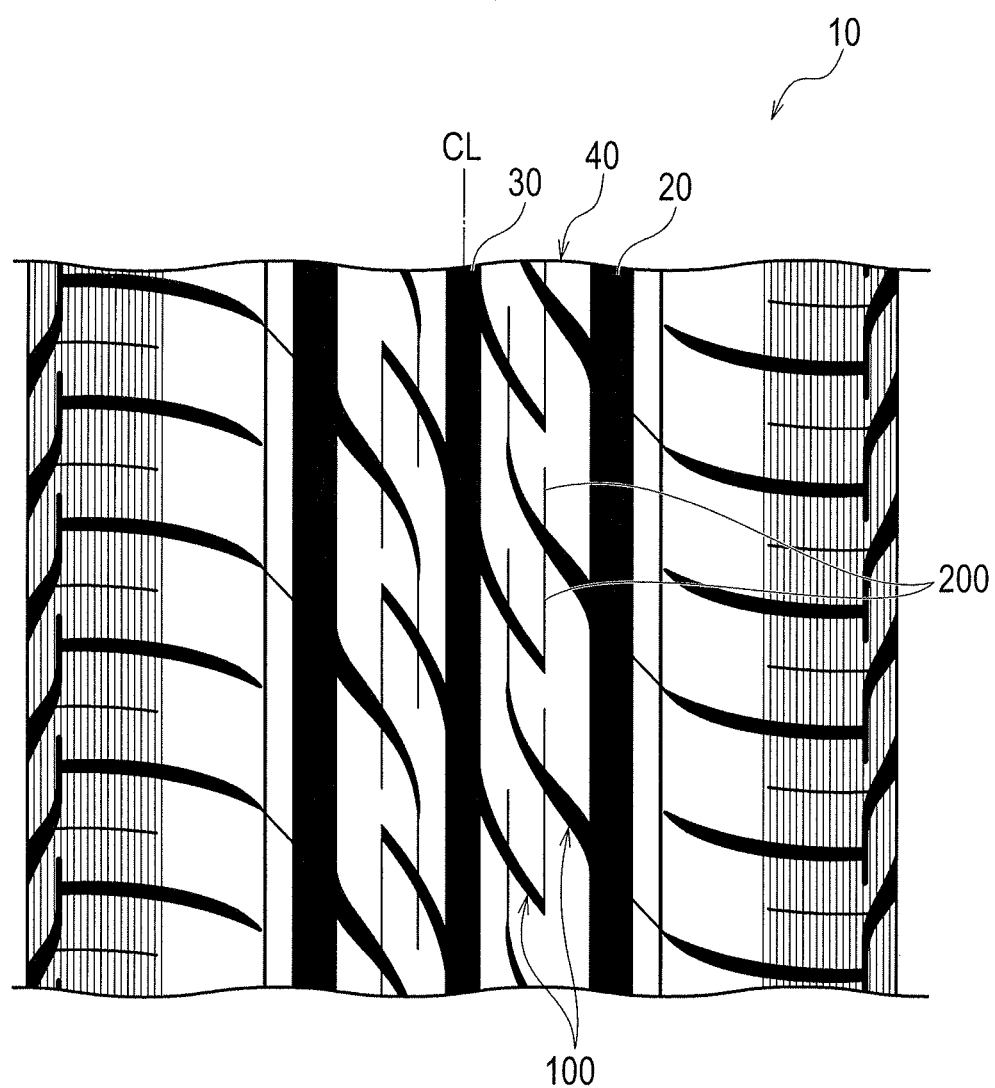
FIG. 1 is a developed plan view illustrating a part of a tread of a pneumatic tire 10 according to a first embodiment.

A tire (pneumatic tire) according to a first embodiment will be explained below with reference to drawings. It is noted that, in the following description of the drawings, the same or similar reference numerals are used to designate the same or similar portions. It is appreciated that the drawings are schematically shown and the ratio and the like of each dimension are different from the real ones.

Accordingly, specific dimensions and the like should be determined in consideration of the explanation below. Moreover, among the drawings, the respective dimensional relations or ratios may differ.

(1-1) Schematic Configuration of Pneumatic Tire

FIG. 1 is a developed plan view illustrating a part of a tread of a pneumatic tire 10 according to a first embodiment. As shown in FIG. 1, on the pneumatic tire 10, a circumferential groove 20 and a circumferential groove 30 are formed. It is noted that the pneumatic tire 10 may be filled with, instead of air, an inert gas such as nitrogen gas. Further, in FIG. 1, a portion with a thin line indicates a region not contacting a road surface with a normal internal pressure and a normal load.

The pneumatic tire 10 is provided with a rib-like land portion 40 extending in a tire circumferential direction $D_C$. In the first embodiment, two rib-like land portions 40 are formed at both sides in a tread widthwise direction $D_T$ with respect to a tire equator line CL. In the rib-like land portion 40, a plurality of inclined grooves 100 and a plurality of circumferential sipings 200 are formed.

The circumferential siping 200 is a straight siping extending in the tire circumferential direction $D_C$. The groove width of the circumferential siping 200 is narrower than the groove width of the inclined groove 100.

(1-2) Shape of Land Portion

Figure 2:
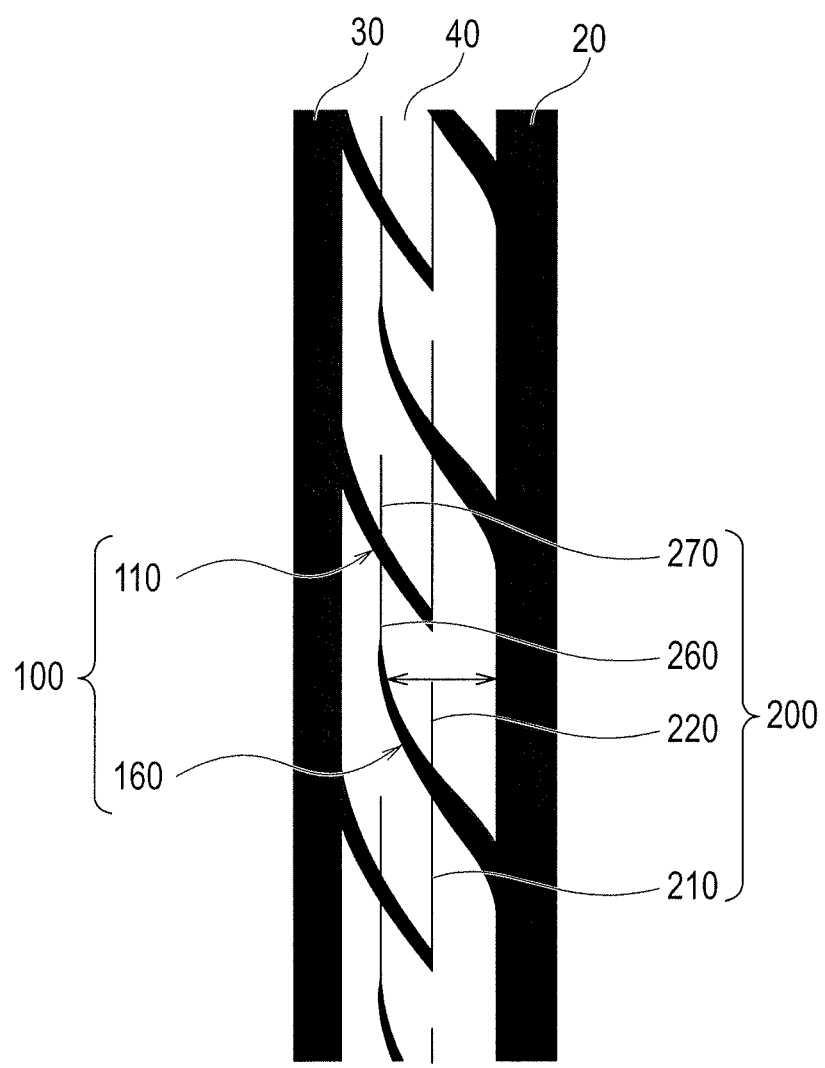
FIG. 2 is an enlarged plan view illustrating a part of a tread of the pneumatic tire 10 according to the first embodiment.

FIG. 2 is an enlarged plan view illustrating a part of a tread of the pneumatic tire 10. As shown in FIG. 2, in the rib-like land portion 40, a first inclined groove 110 that extends from one lateral portion in the tread widthwise direction $D_T$ of the rib-like land portion 40 and that is inclined relative to the tire circumferential direction Dc, and a second inclined groove 160 that extends from the other lateral portion in the tread widthwise direction $D_T$ of the rib-like land portion 40 and that is inclined relative to the tire circumferential direction Dc are formed as the inclined groove 100. The first inclined groove 110 and the second inclined groove 160 are alternately formed in the tire circumferential direction $D_C$.

Further, in the rib-like land portion 40, the circumferential siping 200 is formed by a first circumferential siping 210 formed from the end at the rib-like land portion 40 side of the first inclined groove 110 to an intermediate portion in the tread widthwise direction $D_T$ of the second inclined groove 160, and a third circumferential siping 260 formed from the end at the rib-like land portion 40 side of the second inclined groove 160 to an intermediate portion in the tread widthwise direction $D_T$ of the first inclined groove 110.

Further, in the first embodiment, in the rib-like land portion 40, a second circumferential siping 220 is formed which extends from an intermediate portion in the tread widthwise direction $D_T$ of the second inclined groove 160 along an extended line of the first circumferential siping 210. The second circumferential siping 220 is terminated within the rib-like land portion 40. Further, in the rib-like land portion 40, a fourth circumferential siping 270 is formed which extends from an intermediate portion in the tread widthwise direction $D_T$ of the first inclined groove 110 along an extended line of the third circumferential siping 260. The fourth circumferential siping 270 is terminated within the rib-like land portion 40.

The first circumferential siping 210, the second circumferential siping 220, the third circumferential siping 260, and the fourth circumferential siping 270 extend in approximate parallel with the tire circumferential direction $D_C$; however, these sipings may be inclined by about 5 to 10 degrees about the tire circumferential direction $D_C$ (tire equator line CL). Further, the rib-like land portion 40 in which the first circumferential siping 210, the second circumferential siping 220, the third circumferential siping 260, and the fourth circumferential siping 270 are formed preferably is arranged within a region 60% the tread width including the tire equator line CL, in a state where a normal load is applied to the pneumatic tire 10 set to have a normal internal pressure regulated by Japan Automobile Tyre Manufacturers Association (JATMA), etc.

(1-3) Operation and Effect

According to the pneumatic tire 10, the first inclined groove 110 and the second inclined groove 160 formed alternately in the tire circumferential direction $D_C$ ensure a basic drainage performance of rainwater that has entered the rib-like land portion 40. Further, the formation of the straight first circumferential siping 210 and the third circumferential siping 260 communicated to these inclined grooves enables an improvement of water removal (water absorption) effect in the rib-like land portion 40. Moreover, the rib-like land portion 40 is not divided in the tread widthwise direction $D_T$, and thus, it is also possible to ensure the rigidity of the rib-like land portion 40.

That is, it is possible to ensure the basic drainage performance of rainwater that has entered the grounding surface by the first inclined groove 110 and the second inclined groove 160 having a low angle to be formed with the tread widthwise direction $D_T$, and remove rainwater that has entered the rib-like land portion 40 from the grounding surface by the first circumferential siping 210 and the third circumferential siping 260.

Further, the first circumferential siping 210 and the third circumferential siping 260 are formed at the identical location in the tread widthwise direction $D_T$, that is, the first circumferential siping 210 and the third circumferential siping 260 are formed in a straight line manner in the tire circumferential direction $D_C$, and thus, it is possible to further improve the water removal effect.

That is, the pneumatic tire 10 enables the water drainage performance and the steering stability to coexist at a high level.

In the first embodiment, the second circumferential siping 220 and the fourth circumferential siping 270, in a straight line manner, terminated within the rib-like land portion are formed. Further, the first circumferential siping 210 and the second circumferential siping 220 are formed on a straight line extending in the tire circumferential direction $D_C$, and the third circumferential siping 260 and the fourth circumferential siping 270 are, similarly, formed on a straight line extending in the tire circumferential direction $D_C$. Thus, it is possible to further improve the water removal (water absorption) effect in the rib-like land portion 40.

(1-4) Other Embodiments

So far, the contents of the present invention are disclosed through the embodiment of the present invention. However, it should not be interpreted that the statements and drawings constituting a part of the present disclosure limit the present invention. From this disclosure, a variety of alternate embodiments, examples, and applicable techniques will become apparent to one skilled in the art.

For example, the second circumferential siping 220 and the fourth circumferential siping 270 may not be necessarily formed in the rib-like land portion 40. Further, the circumferential siping 200 may not necessarily be liner; may be of slightly meandering shape, for example.

As described above, needless to say, the present invention includes various embodiments and the like not described here. Therefore, the technical range of the present invention is to be defined only by the inventive specific matter according to the adequate claims from the above description.

[Second Embodiment]

A tire (pneumatic tire) according to a second embodiment will be explained below with reference to drawings. It is noted that, in the following description of the drawings, the same or similar reference numerals are used to designate the same or similar portions. It is appreciated that the drawings are schematically shown and the ratio and the like of each dimension are different from the real ones.

Accordingly, specific dimensions and the like should be determined in consideration of the explanation below. Moreover, among the drawings, the respective dimensional relations or ratios may differ.

(2-1) Schematic Configuration of Pneumatic Tire

Figure 3:
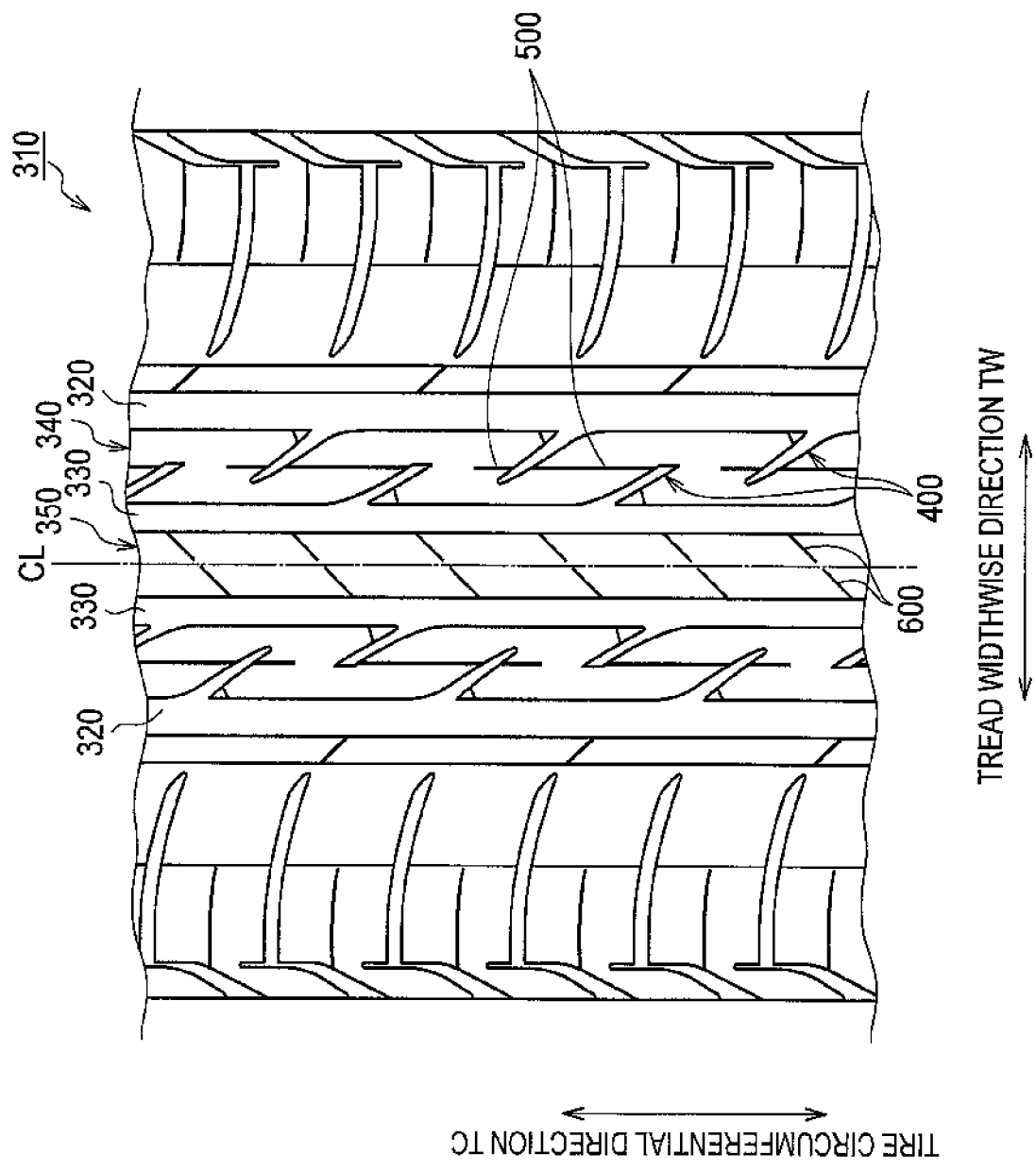
FIG. 3 is a developed plan view illustrating a part of a tread of a pneumatic tire 310 according to a second embodiment.

FIG. 3 is a developed plan view illustrating a part of a tread of a pneumatic tire 310 according to the second embodiment. As shown in FIG. 3, on the pneumatic tire 310, a circumferential groove 320 and a circumferential groove 330 are formed. The circumferential groove 320 and the circumferential groove 330 extend along the tire circumferential direction Tc It is noted that the pneumatic tire 310 may be filled with, instead of air, an inert gas such as nitrogen gas. Further, in FIG. 3, a portion with a thin line indicates a region not contacting a road surface with a normal internal pressure and a normal load. In other words, a portion inside, in a tread widthwise direction Tw, from the portion with a thin line, is the tread grounding surface.

Herein, in the second embodiment, the both ends in the tread widthwise direction Tw of the tread grounding surface indicate the both ends in the tread widthwise direction Tw within a grounding range in a state where the tire contacts the road surface. The state where the tire contacts the road surface indicates a state where the tire is mounted to a normal rim and is applied a normal internal pressure and a normal load, for example. It is noted that the "normal rim" indicates the standard rim in the applicable size defined in the 2008 edition of the Year Book of the JATMA (Japan Automobile Tyre Manufactures Association). The normal internal pressure is the air pressure corresponding to the maximum loading capability set forth in the 2008 edition of the Year Book of the JATMA. The normal load is a load that corresponds to the maximum loading capability when a single wheel is applied, set forth in the 2008 edition of the Year Book of the JATMA. Outside Japan, the specification that defines these is determined on the basis of industrial standards effective in regions where the tire is manufactured or used. For example, this would be the "Year Book of The Tire and Rim Association Inc." in the United States of America, and the "Standards Manual of The European Tire and Rim Technical Organization" in Europe.

Further, when the pneumatic tire 310 is divided by the circumferential groove 320 and the circumferential groove 330, an outer land portion 340 extending in the tire circumferential direction Tc and a center land portion 350 extending in the tire circumferential direction Tc are provided. In the second embodiment, two outer land portions 340 are formed at both sides in the tread widthwise direction Tw with respect to the tire equator line CL. Further, the center land portion 350 is formed inside, in the tread widthwise direction Tw, from the outer land portion 340. The center land portion 350 is arranged at a location including the tire equator line CL. That is, the center land portion 350 is arranged on the tire equator line CL.

In the second embodiment, the outer land portion 340 configures a "land portion" defined in the scope of the claims, and the center land portion 350 configures a "center land portion" defined in the scope of the claims.

In the outer land portion 340, a plurality of inclined grooves 400 and a plurality of circumferential sipings 500 are formed. The circumferential siping 500 is a straight siping extending in the tire circumferential direction Tc. It is noted that in the second embodiment, the siping has a groove width capable of closing when the land portion comes in contact with the ground. Specifically, the siping has a groove width of 1.5 mm or less. However, in the tire such as a TBR tire used for a large bus or a truck, a groove width of the siping may be 1.5 mm or more. It is noted that the groove width of the circumferential siping 500 is narrower than the groove width of the inclined groove 400.

In the center land portion 350, widthwise sipings 600 are cyclically formed with a predetermined interval in the tire circumferential direction. Each widthwise siping 600 extends in the tread widthwise direction Tw. In the second embodiment, the widthwise siping 600 is a straight siping that extends to be inclined relative to the tread widthwise direction Tw.

(2-2) Configuration of Outer Land Portion

Figure 4:
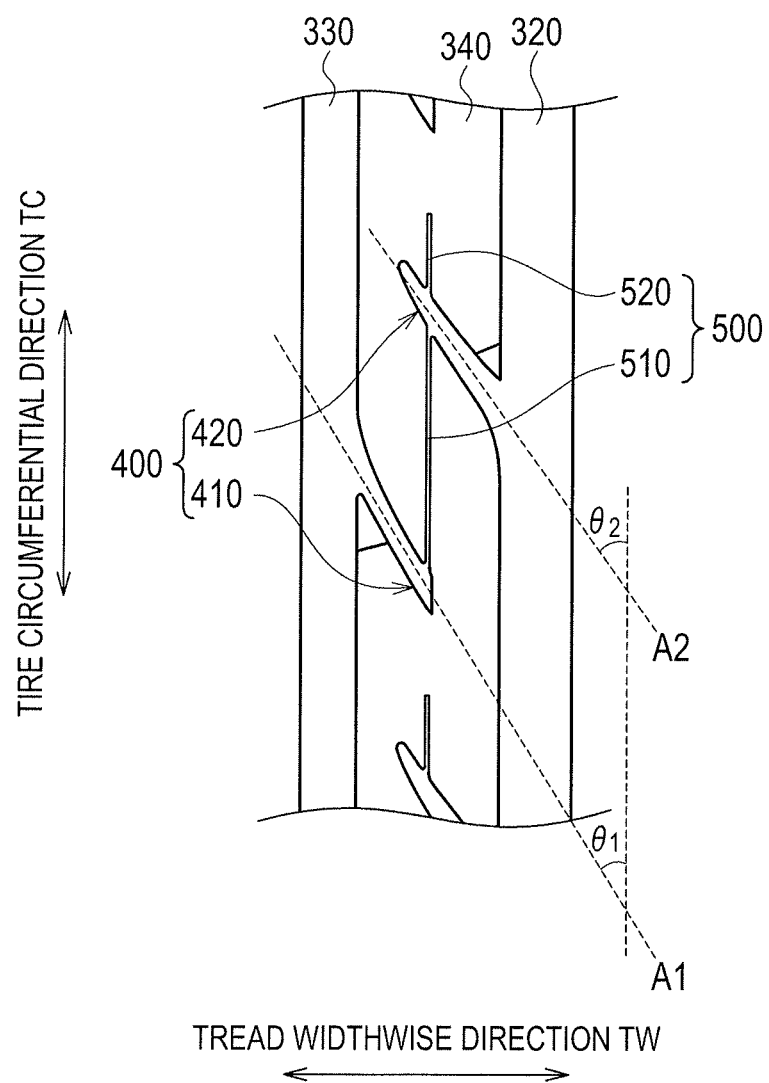
FIG. 4 is an enlarged plan view illustrating a part of a tread of the pneumatic tire 310 according to the second embodiment.

FIG. 4 is an enlarged plan view illustrating a part of a tread of the pneumatic tire 310. As shown in FIG. 4, in the outer land portion 340, a first inclined groove 410 that extends from one lateral portion in the tread widthwise direction Tw of outer land portion 340 and that is inclined relative to the tire circumferential direction Tc, and a second inclined groove 420 that extends from the other lateral portion in the tread widthwise direction Tw of the outer land portion 340 and that is inclined relative to the tire circumferential direction Tc are formed as the inclined groove 400. The first inclined groove 410 and the second inclined groove 420 are alternately formed in the tire circumferential direction Tc.

Further, at least one of an inclined angle $\theta 1$, relative to the tire circumferential direction Tc, of the first inclined groove 410 and an inclined angle $\theta 2$ relative to the tire circumferential direction Tc of the second inclined groove 420 preferably is in a range of 20 degrees or more and 60 degrees or less. It is noted that in the second embodiment, an example in which both the inclined angle $\theta 1$ and the inclined angle $\theta 2$ are in a range of 20 degrees or more and 60 degrees or less will be described.

Specifically, the inclined angle $\theta 1$ formed between a direction A1 in which the first inclined groove 410 extends and a straight line parallel to the tire circumferential direction Tc is in a range of 20 degrees or more and 60 degrees or less. Herein, the direction A1 in which the first inclined groove 410 extends is indicated, in the tread surface view, by a straight line that links a center in the tire circumferential direction Tc, at a lateral portion in the tread widthwise direction Tw of the outer land portion 340, of the first inclined groove 410 and an end point, located closest to the outer land portion 340 side, of the first inclined groove 410. It is noted that when the end, located closest to the outer land portion 340 side, of the first inclined groove 410 is a straight line along the tire circumferential direction Tc, the end point is the center in the tire circumferential direction Tc of the end.

On the other hand, the inclined angle $\theta 2$ formed between a direction A2 in which the second inclined groove 420 extends and a straight line parallel to the tire circumferential direction Tc is in a range of 20 degrees or more and 60 degrees or less. Herein, the direction A2 in which the second inclined groove 420 extends is indicated, in the tread surface view, by a straight line that links a center in the tire circumferential direction Tc, at a lateral portion in the tread widthwise direction Tw of the outer land portion 340, of the second inclined groove 420 and an end point, located closest to the outer land portion 340 side, of the second inclined groove 420. It is noted that when the end, located closest to the outer land portion 340 side, of the second inclined groove 420 is a straight line relative to the tire circumferential direction Tc, the end point is the center in the tire circumferential direction Tc of the end.

Further, in the outer land portion 340, a first circumferential siping 510 formed from the end at the outer land portion 340 side of the first inclined groove 410 to an intermediate portion in the tread widthwise direction Tw of the second inclined groove 420, and a second circumferential siping 520 extending from an intermediate portion in the tread widthwise direction Tw of the second inclined groove 420 along on an extended line of the first circumferential siping 510 are formed as the circumferential siping 500. Further, the second circumferential siping 520 is terminated within the outer land portion 340. It is noted that in the pneumatic tire 310, an acute angle portion, which forms an acute angle in the tread surface view, is formed in the outer land portion 340 by the first inclined groove 410 inclined relative to the tire circumferential direction Tc and the first circumferential siping 510 extending in the tire circumferential direction Tc.

Further, the first circumferential siping 510 and the second circumferential siping 520 extend in approximate parallel with the tire circumferential direction Tc; however, these sipings may be inclined by about 5 to 10 degrees about the tire circumferential direction Tc (tire equator line CL). Further, the outer land portion 340 in which the first circumferential siping 510 and the second circumferential siping 520 are formed preferably is arranged within a region 60% the tread width including the tire equator line CL, in a state where a normal load is applied to the pneumatic tire 310 set to have a normal internal pressure regulated by Japan Automobile Tyre Manufacturers Association (JATMA), etc.

(2-3) Shape of Center Land Portion

Figure 5:
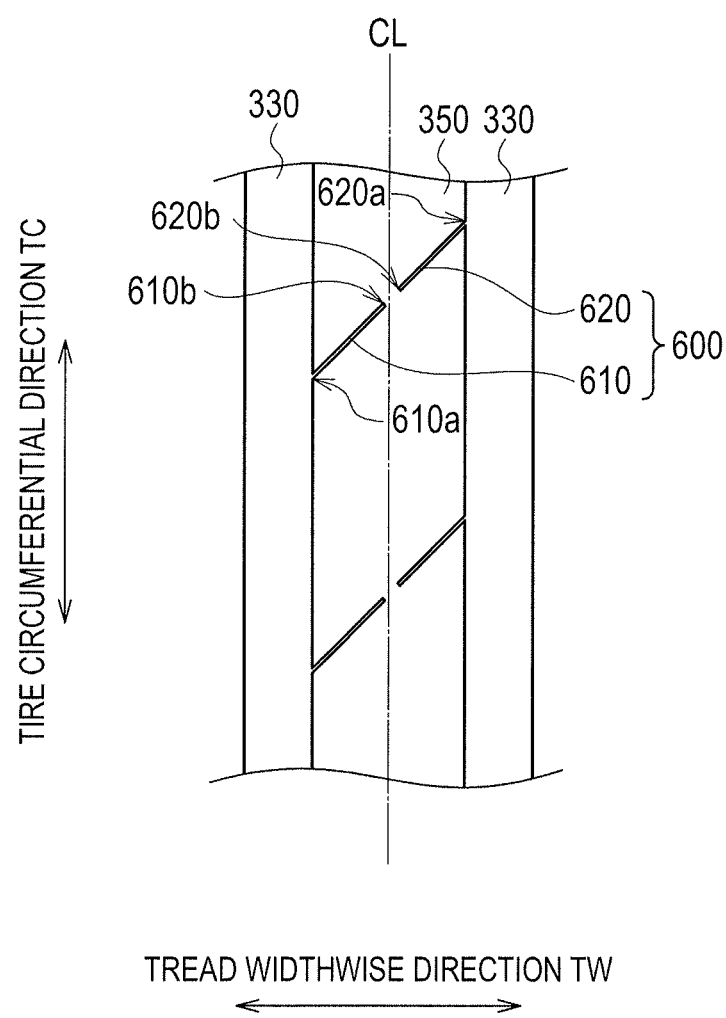
FIG. 5 is an enlarged plan view illustrating a part of a tread of the pneumatic tire 310 according to the second embodiment.

FIG. 5 is an enlarged plan view illustrating a part of a tread of the pneumatic tire 310. As shown in FIG. 5, in the center land portion 350, a first widthwise siping 610 that extends from one lateral portion in the tread widthwise direction Tw of the center land portion 350 and that is terminated within the center land portion 350, and a second widthwise siping 620 that extends from the other lateral portion in the tread widthwise direction Tw of the center land portion 350 and that is terminated within the center land portion 350 are formed as the widthwise siping 600.

Specifically, in the first widthwise siping 610, one end 610a is opened to the circumferential groove 330 adjacent to one side of the center land portion 350, and the other end 610b is terminated within the center land portion 350. Further, in the second widthwise siping 620, one end 620a is opened to the circumferential groove 330 adjacent to the other side of the center land portion 350, and the other end 620b is terminated within the center land portion 350.

Further, the second widthwise siping 620 preferably extends along on an extended line of the first widthwise siping 610. It is noted that in the second embodiment, the first widthwise siping 610 and the second widthwise siping 620 extend in approximate parallel to each other; these may extend in respectively different directions. An angle formed between a straight line along the tread widthwise direction Tw and a direction in which the first widthwise siping 610 extends preferably is 0 degree or more and less than 60 degrees relative to the tread widthwise direction Tw. Similarly, an angle formed between a straight line along the tread widthwise direction Tw and a direction in which the second widthwise siping 620 extends preferably is 0 degree or more and less than 60 degrees relative to the tread widthwise direction Tw.

Further, the first widthwise siping 610 and the second widthwise siping 620 are terminated outside, in the tread widthwise direction Tw, from the tire equator line CL, within the center land portion 350. Specifically, the end 610b of the first widthwise siping 610 and the end 620b of the second widthwise siping 620 are located outside, in the tread widthwise direction Tw, from the tire equator line CL. That is, an isolation portion in which the first widthwise siping 610 and the second widthwise siping 620 are isolated is formed on the tire equator line CL.

(2-4) Operation and Effect

According to the pneumatic tire 310 according to the second embodiment, the first inclined groove 410 and the second inclined groove 420 formed alternately in the tire circumferential direction Tc ensure a basic drainage performance of rainwater that has entered the outer land portion 340. Further, the formation of the straight first circumferential siping 510 and the second circumferential siping 520 communicated to these inclined grooves 400 (the first inclined groove 410 and the second inclined groove 420) enables an improvement of water removal (water absorption) effect in the outer land portion 340. Moreover, the outer land portion 340 is not divided in the tread widthwise direction Tw, and thus, it is possible also to ensure the rigidity of the outer land portion 340.

Further, in the second embodiment, the inclined angle θ1, relative to the tire circumferential direction Tc, of the first inclined groove 410 and the inclined angle θ2, relative to the tire circumferential direction Tc, of the second inclined groove 420 are in a range of 20 degrees or more and 60 degrees or less. According to such a pneumatic tire 310, a corner portion formed, by the first inclined groove 410 and the second inclined groove 420, in the outer land portion 340 is less likely to be peeled off during tire rolling, and thus, it is possible to improve a grounding property.

In particular, in the outer land portion 340, the first inclined groove 410 and the second inclined groove 420 are alternately formed in the tire circumferential direction Tc, and thus, it is possible to ensure the rigidity of the outer land portion 340 not only in a case where the inclined angles θ1 and θ2 are a low angle (for example, in a range of 45 to 60 degrees) but also in a case where the inclined angles θ1 and θ2 are a slightly high angle (for example, 30 to 45 degrees). Further, in the outer land portion 340, the first circumferential siping 510 communicating to the first inclined groove 410 and the second circumferential siping 520 communicating to the second inclined groove are formed, and thus, it is possible to ensure a water removal (water absorption) effect on the surface of the outer land portion 340 even in a case where the inclined angles θ1 and θ2 are a slightly high angle (for example, in a range of equal to or more than 30 degrees and equal to or less than 45 degrees). That is, it is possible to ensure the rigidity of the outer land portion 340 while ensuring the water removal effect.

Thus, the pneumatic tire 310 according to the second embodiment enables the water drainage performance and the steering stability to coexist at a high level.

In the second embodiment, the second circumferential siping 520, in a straight line manner, terminated within the outer land portion 340 is formed. Further, the first circumferential siping 510 and the second circumferential siping 520 are formed at the identical location in the tread widthwise direction Tw. That is, the first circumferential siping 510 and the second circumferential siping 520 are formed to be liner in the tire circumferential direction Tc. Thus, it is possible to further improve the water removal (water absorption) effect in the outer land portion 340.

Further, in the center land portion 350, by the first widthwise siping 610 and the second widthwise siping 620, the widthwise sipings 600 are cyclically formed in the tire circumferential direction 600.

Further, the second widthwise siping 620 extends along on an extended line of the first widthwise siping 610. Such a pneumatic tire 310 enables removing of water that has entered the center land portion 350 from the grounding surface so as to improve a water drainage performance. Further the pneumatic tire 310 enables appropriately restraining of the rigidity of the center land portion 350 so as to restrain a center wear.

Further, the first widthwise siping 610 and the second widthwise siping 620 are terminated outside, in the tread widthwise direction Tw, from the tire equator line CL, within the center land portion 350. That is, in the center land portion 350, an isolation portion in which the first widthwise siping 610 and the second widthwise siping 620 are isolated is formed on the tire equator line CL. Such a pneumatic tire 310 enables prevention of the rigidity of the center land portion 350 from drastically decreasing, and thus, to ensure the steering stability.

(2-5) Other Embodiments

So far, the contents of the present invention are disclosed through the embodiment of the present invention. However, it should not be interpreted that the statements and drawings constituting a part of the present disclosure limit the present invention. From this disclosure, a variety of alternate embodiments, examples, and applicable techniques will become apparent to one skilled in the art.

For example, the circumferential siping 500 may not necessarily be liner; may be of slightly meandering shape. The widthwise siping 600 may not necessarily be liner; may be of slightly meandering shape, for example.

Further, in the above-described embodiments, the second widthwise siping 620 is formed so as to extend on an extended line of the first widthwise siping 610; however, the second widthwise siping 620 may be formed at a location shifted, by a predetermined interval in the tire circumferential direction Tc, from the extended line of the first widthwise siping 610.

As described above, needless to say, the present invention includes various embodiments and the like not described here. Therefore, the technical range of the present invention is to be defined only by the inventive specific matter according to the adequate claims from the above description.

INDUSTRIAL APPLICABILITY

According to a characteristic of the present invention, it is possible to provide a tire that enables the water drainage performance and the steering stability to coexist at a high level.

The invention claimed is:

1. A tire comprising a land portion divided by a circumferential groove extending in a tire circumferential direction and extending in the tire circumferential direction, and a circumferential siping, which is formed in the land portion, extending in the tire circumferential direction, wherein
the land portion is formed with:
a first inclined groove that extends from one lateral portion in a tread widthwise direction of the land portion and that is inclined relative to the tire circumferential direction; and
a second inclined groove that extends from the other lateral portion in the tread widthwise direction of the land portion and that is inclined relative to the tire circumferential direction,
the first inclined groove and the second inclined groove are alternately formed in the tire circumferential direction,
the circumferential siping includes:
a first circumferential siping that is formed from an end at a land portion side of the first inclined groove to an intermediate portion in the tread widthwise direction of the second inclined groove; and
a second circumferential siping that extends from an intermediate portion in the tread widthwise direction of the second inclined groove along on an extended line of the first circumferential siping, and
the second circumferential siping is terminated within the land portion.

2. The tire according to claim 1, wherein
at least one of an inclined angle of the first inclined groove relative to the tire circumferential direction and an inclined angle of the second inclined groove relative to the tire circumferential direction is in a range of 20 degrees or more and 60 degrees or less.

3. The tire according to claim 1, wherein
the circumferential siping includes a third circumferential siping that is formed from an end at a rib-like land portion side of the second inclined groove to an intermediate portion in the tread widthwise direction of the first inclined groove.

4. The tire according to claim 1, wherein
the circumferential siping is liner.

5. The tire according to claim 1, further comprising:
a center land portion formed inside relative to the land portion in the tread widthwise direction, wherein
the center land portion is arranged at a location including a tire equator line,
a widthwise siping that extends in the tread widthwise direction is formed in the center land portion,
the widthwise siping includes:
a first widthwise siping that extends from one lateral portion in the tread widthwise direction of the center land portion and that is terminated within the center land portion; and
a second widthwise siping that extends from the other lateral portion in the tread widthwise direction of the center land portion and that is terminated within the center land portion, and
the first widthwise siping and the second widthwise siping are terminated outside in the tread widthwise direction from the tire equator line.

6. The tire according to claim 5, wherein the second widthwise siping extends along on an extended line of the first widthwise siping.

* * * * *